United States Patent [19]

Schaffling

[11] 4,120,153

[45] Oct. 17, 1978

[54] SOLID PROPELLANT GAS GENERATING DEVICE

[75] Inventor: Otto G. Schaffling, Cheshire, Conn.

[73] Assignee: Olin Corporation, New Haven, Conn.

[21] Appl. No.: 373,125

[22] Filed: May 21, 1964

Related U.S. Application Data

[62] Division of Ser. No. 143,274, Oct. 2, 1961, Pat. No. 3,947,523.

[51] Int. Cl.$^2$ ............................................. F02K 9/04
[52] U.S. Cl. .................................... 60/255; 102/103
[58] Field of Search ................. 60/35.6, 255; 102/98; 86/1, 20

[56] References Cited

U.S. PATENT DOCUMENTS

| | | | |
|---|---|---|---|
| 2,479,470 | 8/1949 | Carr | 149/15 |
| 2,563,265 | 8/1951 | Parsons | 60/255 |
| 3,012,508 | 12/1961 | Stanley | 102/103 |
| 3,032,437 | 5/1962 | Pitchford | 102/103 |
| 3,046,829 | 7/1962 | Roemer | 86/1 R |
| 3,144,829 | 8/1964 | Fox | 60/255 |

Primary Examiner—Samuel Feinberg
Attorney, Agent, or Firm—Donald R. Motsko; H. Samuel Kieser

EXEMPLARY CLAIM

1. In combination with a vessel forming a rocket motor combustion chamber, a rubber-base liner firmly adhering to the interior chamber wall, said rubber-base liner containing between about 2.5 and 30 percent by weight of an inorganic metal salt selected from the group consisting of zinc chromate, barium chromate, zinc phosphate, lead phosphate, potassium phosphate, and mixtures thereof, and a propellant charge substantially filling the lined portion of the chamber, said propellant charge firmly adhering to said liner.

8 Claims, 2 Drawing Figures

INVENTOR.
OTTO G. SCHAFFLING
BY H. Samuel Kieser

SOLID PROPELLANT GAS GENERATING DEVICE

The present application is a division of copending application Ser. No. 143,274, filed Oct. 2, 1961, by Otto G. Schaffling, now U.S. Pat. No. 3,947,523.

This invention relates to improvements in rocket motors and other gas generating devices which utilize solid propellants. More particularly, this invention relates to improvements in bonding characteristics between the insulating liner of rocket motor combustion chamber walls and the propellant charge contained within the chamber.

Rocket motors are generally comprised of a suitable vessel having a nozzle in one end thereof, a combustion chamber containing a propellant charge, and an ignition system capable of igniting the propellent charge when desired. Control of the thrust throughout the combustion period of the propellant may be obtained by shaping of the propellant to give burning surfaces that will yield the desired thrust program during the combustion period. The use of propellants in the form of a rod, rod with internal star, hollow rod, multiple port rod, and the like, for this purpose is well known in the art. In addition, certain desired surfaces of the propellant may be coated with a suitable inhibitor to suppress burning of these surfaces, thereby providing another means of controlling the thrust. One method of inhibiting the burning surface of the propellant comprises coating the interior surface of the combustion chamber, after suitable surface preparation, with an insulating binder, and the exterior periphery of the propellant, by casting or otherwise, is then secured to the interior combustion chamber surfaces by means of the insulating binder. The insulating binder may be used for several purposes. It may serve as an insulator for the rocket vessel to protect it against the high temperatures generated during combustion. It may serve as a binder to secure the propellant to the wall of the combustion chamber. In addition, it may be used to inhibit burning of the outer periphery of the propellant. Considerable difficulty has been encountered in obtaining a satisfactory liner material that will serve all three purposes. Various elastomeric materials have been used as the insulating liner, but the bond between the liner and propellant often fails if the rocket is stored for extended periods after fabrication or if the rocket is subjected to extreme variations in temperature conditions prior to or during firing. Therefore it is necessary to fire such rockets very soon after fabrication, and expensive and cumbersome means must be employed to maintain the temperature of the rocket relatively constant prior to firing. Unless these precautions are taken, there may be failure of the bond between the liner and propellant, which results in uncontrolled burning of the propellant during the combustion period. Such uncontrolled burning not only causes undesired variations in the thrust program, but also may cause rupture and/or explosion of the rocket vessel. In addition, when nitroglycerine is employed as a component of the propellant, there is a migration of the nitroglycerine through the propellant and liner to the chamber wall, which often causes failure of the bond between the liner and wall, thereby resulting in uncontrolled burning of the propellant.

It is a primary object of this invention to overcome the disadvantages inherent in conventional techniques for bonding rocket motor liners and rocket motor propellant charges.

A further object of this invention is to provide an improved rocket motor.

Still another object of this invention is to provide an insulating liner for the combustion chamber of rocket motors having improved bonding properties.

It is another object of this invention to provide an improved process for preparing rocket motors.

Still a further object of this invention is to provide a rocket motor combustion chamber having an insulating liner bonded to the propellant charge, wherein the bond between the liner and the propellant charge resists deterioration during extended periods of storage.

Another object of the invention is to provide a novel rocket motor liner which remains firmly bonded to the propellant when subjected to extreme variations in temperature.

It is a further object of the invention to provide a novel insulating liner for rocket motors which inhibits migration of nitroglycerine from propellants containing it.

These and other objects of the invention will be apparent from the following detailed description thereof.

It has now been discovered that improved bonding between a rubbery liner of a rocket motor combustion chamber and a solid propellant charge is readily obtained by coating the interior surfaces of the combustion chamber with a layer of an uncured fluid mixture capable of being cured and solidified to a material having rubbery properties, the fluid containing between about 2.5 and about 30 percent by weight of an inorganic metal salt. After curing and solidification of the rubbery liner a thermoplastic propellant charge is then cast into the lined portion of the chamber, and upon solidification of the propellant charge, a strongly adhering bond is formed between the rubbery liner and the propellant charge.

Figure 1:
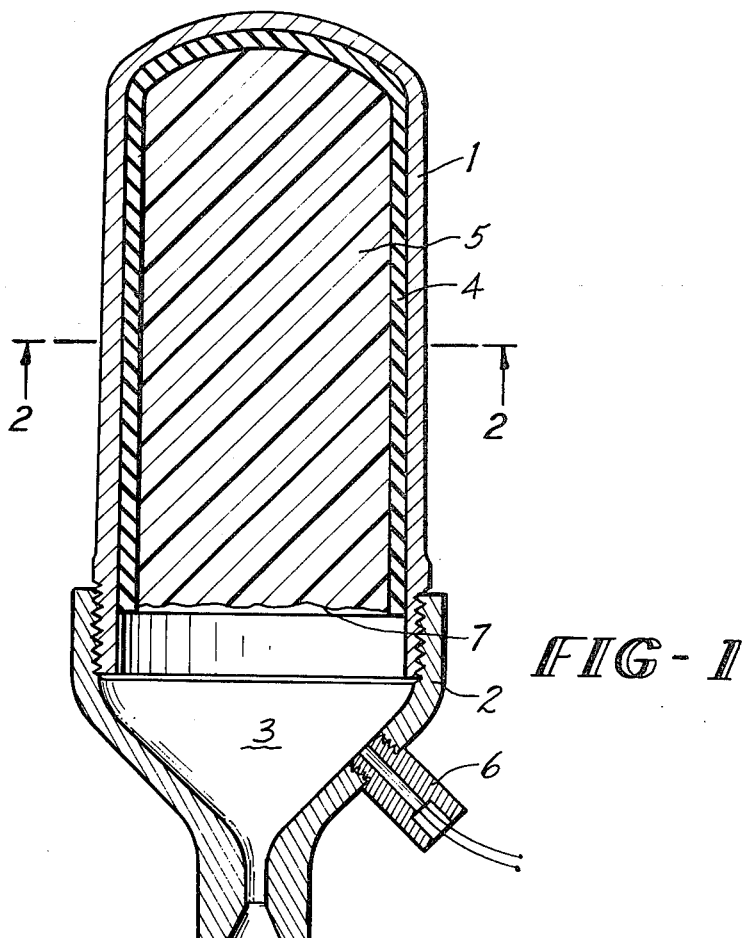
FIG. 1 is a sectional elevational view of a rocket motor incorporating the novel liner of this invention.

Referring to FIG. 1, the rocket motor thereshown comprises a shell 1 constructed of steel, aluminum, or other suitable metal or material of construction. Shell 1 has a cap 2 formed of the same or similar material to form shell 1. Cap 2 encloses a combustion chamber 3. A major portion of combustion chamber 3 is filled with a charge consisting of a liner 4 bonded to the internal surface of shell 1 and a solid propellant 5 bonded to the liner 4. An ignition device 6 is secured to the cap 2 and may be of any conventional design which will provide for ignition of the solid propellant 5 at the desired time. The ignition device 6 shown in the drawing is an electric squib which when subjected to an electric current provides combustion products and/or flame which impinge on exposed surface 7 of solid propellant 5 to effect ignition thereof, and the resulting ignition forms gaseous composition products which are discharged from nozzle opening 8.

More in detail, rocket motor vessels, gas generator vessels, and the like, constructed of a suitable material such as steel alloy, stainless steel, aluminum alloy, low carbon steel, ceramic lined steel, molded epoxy resin-coated glass fiber, and the like, may be treated in accordance with the technique of the instant invention. For purposes of clarity, the invention will be described as applied to rocket motor vessels, but it will be recognized by those skilled in the art that the invention is applicable to gas generators, and other devices which employ solid propellant. The interior surfaces of the combustion chamber are cleaned by sanding and/or applying cleaning solvents to remove rust, grease and the like, to improve bonding between the interior combustion chamber surface and the liner.

The liner is formed from an uncured fluid mixture containing an inorganic metal salt, the mixture being capable of being cured and solidified to a material having rubbery properties. It is preferred to employ a mixture of an inorganic metal salt, an epoxy resin and a rubberbase material with conventional curing agents, since the epoxy resin component not only enhances the bonding strength of the liner but also impedes the migration of nitrogelycerine from the propellant to the combustion chamber surfaces. However if the propellant does not contain nitroglycerine, satisfactory results can be obtained by omitting the epoxy resin component.

The words "liquid" and "fluid" when used to define the uncured fluid mixture capable of being cured and solidified to a material having rubbery properties throughout the description and claims are intended to include solutions, dispersions, slurries or paste-like fluids having the consistency of conventional rubber-base cement.

Rubber-base materials suitable for use in preparing the liner of the instant invention include fluid polymers or copolymers of one or more rubber-forming diolefins, such as butadiene and including substituted butadienes such as isoprene, chloroprene, dimethyl butadiene, methyl pentadiene, and the like, with or without other suitable copolymerizable materials such as acrylic acid, styrene vinyl esters, acrylic esters, methacrylic esters, and the like. Liquid dispersions or sulutions of natural rubber, "C" rubber, nitrile rubber, GRS rubber, neoprene, polysulfide rubber, cellulose acetate, and the like, which may be cured and solidified by the application of a curing agent and/or heat may be employed.

Curing agents for these rubber-base materials are well known in the art, and will vary with the type of rubber base material employed. For example, magnesium oxide, diphenylguanidine, p-quinonedioxime, peroxides, sulfur, and the like, are suitable curing agents.

The epoxy component of the rubbery liner of the present invention comprises liquid monomeric or polymeric polyepoxides containing a plurality of epoxide groups having the formula

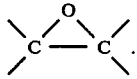

At least one of these groups in the polyepoxides is terminal. The polyepoxides may be saturated or unsaturated aliphatic, cycloaliphatic, aromatic or heterocyclic and may carry non-interfering substituents, for example, chlorine, hydroxyl or ether groups. The polyepoxides are commonly formed by any of several reactions. One type by the reaction of aromatic or aliphatic polyhydroxy compounds with epichlorohydrin. Also useful in place of epichlorohydrin are 3-chloro-1,2-epoxybutane, 3-bromo-1, 3-epoxyhexane, 3-chloro-1,2-epoxyoctane and the like. To form the epoxy resins, the epoxide is reacted with an aliphatic or aromatic polyhydric compound, for example, bisphenol A, resorcinol or polynuclear phenols, for example, 4,4'-dihydroxybenzophenone or bis(4-hydroxyphenyl) ethane. Sorbitol, glycerol and pentaerythritol are examples of suitable polyhydroxy aliphatic compounds. Any of the commercially available epoxy resins are suitable for use in the present compositions including the resins sold under the names of Epon, Araldite ERL and Epi-Rez. Epon 828 is an epoxy resin formed from bisphenol A and epichlorohydrin and has average molecular weights of 350 to 400 and viscosities of 5,000 to 15,000 centipoises at 25° C. (Gardner Holdt). Epon 834 is similar to Epon 828 but has molecular weights of about 450 and viscosities between $A_1$ and $A_2$ (Gardner Holdt). Araldite 6010 is similar to Epon 828 but has a viscosity of 16,000 centipoises. ERL is similar to Epon 828 but has viscosities of 10,500 to 19,500 centipoises. Epi-Rez 510 is similar to Epon 828 but has viscosities of 9,000 to 18,000 centipoises.

Other suitable epoxies include the Oxiron, peracetic and Novolac types. The Oxiron resins are epoxidized aliphatic polyolefins which contain epoxy groups terminally and along the carbon chain. The peracetic resins are obtained by epoxidation of olefins by oxygen and selected metal catalysts or by peracetic acid. Unox Epoxide 201 is a bicyclo-diepoxycarboxylate, Unox Epoxide 207 is bicyclopentadiene dioxide and Unox Epoxide 206 is vinylcyclohexene dioxide. Novolac resin DER is an epoxidized polynuclear polyhydric phenol. Additional data concerning these resins appears in Lee and Neville, "Epoxy Resins, Their Application and Technology," McGraw-Hill Book Company, Inc. New York, 1957.

Inorganic metal salts suitable for use in the instant invention include metal salts of chromates, bichromates and phosphates. Typical examples of suitable metal salts include zinc chromate, zinc phosphate, lead phosphate, barium chromate, magnesium chromate, sodium phosphates, potassium phosphates, mixtures thereof, and the like. The metal salts are used in finely divided form, for example, particles which pass a 100 mesh screen, in order to obtain adequate dispersion in the rubber base material. Zinc chromate appears to yield a better bonding liner than the other metal salts tested.

The uncured fluid mixture used in the preparation of the liner is prepared by admixing the epoxy resin, rubber-base material, inorganic metal salt and curing agent to yield a substantially homogeneous mixture. The proportion of metal salt is between about 2.5 and about 30 percent by weight, the proportion of curing agents is between about 5 and about 20 percent by weight and the proportion of combined epoxy resin and rubber-base material is between about 50 and about 90 percent by weight of the mixture. The weight ratio of rubber-base material to epoxy resin in the mixture is preferably between about 1:1 and about 5:1, but the epoxy resin component may be omitted under certain circumstances, if desired, as discussed above. The ratio of rubber-base material to epoxy resin should not be less than about 1:1, since the use of excessive epoxy resin may eliminate most of the desirable elastic properties of the liner.

The uncured fluid mixture capable of being cured and solidified to a material having rubbery properties, with or without an epoxy component, as the case may be, is applied to the interior surfaces of the combustion chamber by any suitable means, such as by brushing, by applying with a spatula, and the like. If desired the mixture may be formed or mixed with a suitable solvent such as ethyl acetate, acetone, hexane, then the solution of organic material is sprayed onto the interior surfaces of the combustion chamber, and the solvent is evaporated to yield a rubbery liner. In one embodiment of the invention, the cylindrical rocket motor vessel is placed on motor driven rollers or other suitable apparatus to rotate the rocket motor at a rate sufficient to develope the necessary centrifugal force to maintain a substantially uniform thickness of the layer of uncured fluid mixture on the interior of the vessel until it is cured sufficiently to retain its layer form without rotation. Application of the lining material and rotation is continued until the desired thickness of rubber-base liner is obtained. The thickness of the rubber-base lining is preferably between about 1/32 and about ¼ inches, but any suitable thickness that will impart the desired degree of insulation to the combustion chamber vessel may be employed.

If desired, several layers of rubber-based material and epoxy resin may be employed to form the liner. For example, the combustion chamber wall is coated with a layer of the above defined uncured mixture, and after curing, a thin layer of epoxy resin is applied. After curing, another layer of the fluid uncured mixture is applied. Such a composite liner is particularly suitable for inhibiting the migration of nitroglycerine from propellants containing it.

Figure 2:
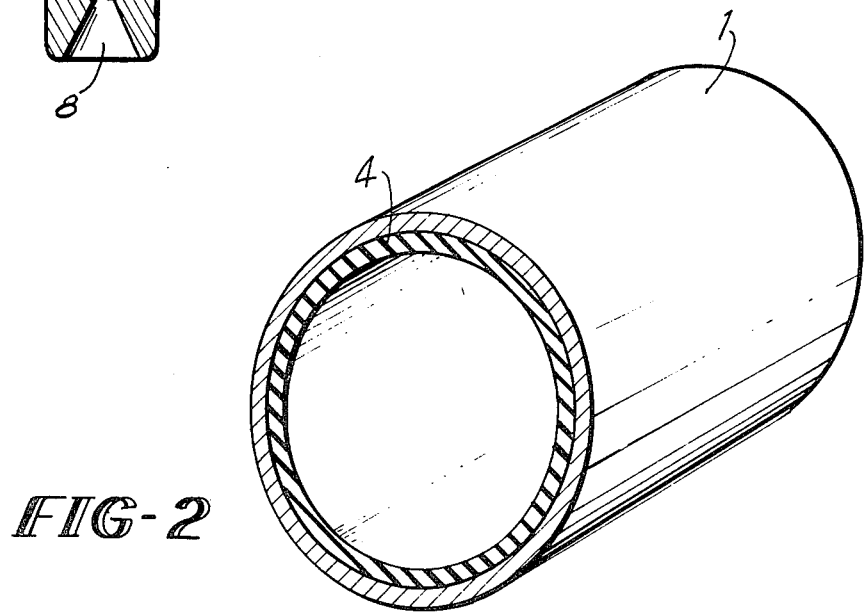
FIG. 2 is a sectional isometric view through plane 2—2 of FIG. 1, prior to the addition of the solid propellant.

After applying the fluid uncured mixture to the combustion chamber surfaces in the manner described above, solidification of the rubber-base liner is completed, due to the effect of the curing agent, with or without the application of heat. It is preferred to employ a curing agent and complete curing of the liner at ambient temperature for a period at least about 12 hours and as long as about 10 days or more. However solidification of the liner may be effected at elevated temperatures, for example, up to about 80° C., in less than about 6 hours. FIG. 2 shows the rocket motor prior to the addition of the solid propellant 5.

Rocket motor casings lined in accordance with the technique of the instant invention may be stored for extended periods, for example, as long as 90 days before adding the propellant charge, without adversely affecting the bonding characteristics between the liner and propellant.

Any thermoplastic propellant charge may be employed that is capable of being poured and cast inside the combustion chamber of the rocket motor and subsequently solidified by curing. Suitable propellant charges include the rubber-based and asphalt base propellants containing oxidizers such as ammonium perchlorate, potassium perchlorate, ammonium nitrate, and the like; propellants such as nitrocellulose, nitroglycerine, cyclonite, pentaerythrite tetranitrate and mixtures thereof; and metal additives such as powdered aluminum, boron, copper and mixtures thereof. A typical analysis of a suitable thermoplastic propellant composition is as follows:

| Component | Parts by Weight |
| --- | --- |
| Nitrocellulose | 58.6 |
| Nitroglycerine | 24.2 |
| Dimethyl Phthalate | 9.6 |
| Dinitrotoluene | 6.6 |
| Ethyl Centralite | 1.0 |
| Carbon Black | 0.1 |

Other suitable solid propellant compositions such as double base propellants, composite double base propellants and those set forth in *Rocket Propulsion Elements*, by George P. Sutton, published by John Wiley and Sons, Inc., Second Edition (1956), may be employed.

The shape of the propellant may be in the form of a rod, hollow rod, star, etc., or other desired shape that can be cast in accordance with prior art techniques.

After solidification of the propellant charge a suitable closure means having a nozzle for discharging combustion gases is then secured to the open end of the chamber. A suitable ignition means is also provided in the conventional manner.

When an inorganic metal salt is employed as a component of the rubber-base liner and a propellant charge is cast into the liner in accordance with the technique of the instant invention, an exceptionally strong bond is obtained between the rubber-base liner and the propellant charge, and substantially no rupturing of the bond is effected during storage, during extreme temperature variations or when the propellant charge is ignited. As a result, substantially uniform burning and uniform thrust are obtained throughout the entire combustion period. In addition, it has been found that rocket motors prepared in this manner can be stored indefinitely without any significant deterioration in the bond between the rubber-base liner and the propellant charge. Furthermore, when subjected to extreme temperature variations, for example, cycling tests in which the rocket motors are stored at a temperature of $-40°$ C. for 24 hours, then removed and limmediately placed in an atmosphere at 60° C., and maintained in this atmosphere for 24 hours, and then returned to storage at $-40°$ C., the rocket motors of the instant invention resisted bond failure after being subjected to more than 10 cycles.

The technique of the instant invention is particularly effective when used in combination with the technique of my copending application Ser. No. 143,275, filed Oct. 2, 1961 U.S. Pat. No. 3,965,676, wherein a layer of the uncured fluid mixture is applied to the combustion chamber surfaces, and before solidification, powder grains are partially embedded in the exterior surface of the layer. The mixture is cured and solidified, and a thermoplastic propellant is then cast into the resulting rubber-base liner having powder grains embedded therein.

The following examples are presented to illustrate the invention more fully without any intention of being limited thereby. All parts and percentages are by weight unless otherwise specified.

EXAMPLE I

A rubber-base lining composition was prepared as follows: 35 parts of an epoxy resin having a molecular weight of about 375 formed by reacting epichlorohydrin with bisphenol A, were admixed with 5 parts of powdered zinc chromate until substantially homogeneous. To this mixture were added 52.3 parts of a copolymer of butadiene and acrylic acid, and mixing was continued until a substantially homogeneous mass was formed. A curing composition was prepared by admixing 5 parts of p-quinonedioxime, 0.2 parts diphenylguanidine and 2.5 parts magnesium oxide, and the resulting homogeneous curing composition was then admixed with the resin-rubber-base-zinc chromate mixture until substantially homogeneous. All mixing was carried out at room temperature.

A tensile testing apparatus was constructed which was comprised of two square steel plates, having a surface area on each face of 2.5 in.$^2$, each plate being secured on one face to a pivot arm, which was operatively connected to a tensile strength measuring device. The unattached faces of the two plates are cemented together to form a "sandwich" of steel plate/rubber-base liner/thermoplastic propellant/rubber-base liner/steel plate. The pivot arms then force the steel plates apart, the force necessary to cause rupture of the "sandwich" being measured in pounds per square inch.

A portion of the fluid rubber-base composition, prepared as described above, was applied to the open face of each steel plate with a brush to form a layer of substantially uniform thickness (about 1/32 inch).

The rubber-base liner was cured at ambient temperature for 1 day. The two plates with rubber-base liner were then cemented together with a ½ inch thickness of a thermoplastic composite double base propellant containing nitroglycerine, nitrocellulose, ammonium perchlorate, powdered aluminum and additives. The cementing was effected by placing the two lined plates vertical in a parallel position and ½ inch apart, then taping the bottom and two adjacent sides with a double thickness of masking tape to form a mold. The fluid propellant was then poured into the top of the mold to fill it, and the taped plates with propellant were heated to a temperature of 60° C. for about 24 hours to effect curing of the propellant. The sandwiches were then cooled to ambient temperatures and the tape was removed.

After curing of the "sandwich," the plates were pulled apart in the tensile strength testing apparatus. The maximum tensile strength and position of the break were noted. The procedure was repeated for two additional "sandwiches" prepared in the same manner. The average tensile strength of the three specimens was 77 pounds per square inch, and in each test, the break in the sandwich occurred through the propellant, thus demonstrating that the bond formed by the technique of the instant invention betwlen the liner and propellant was stronger than the bond of the propellant alone.

For purposes of comparison, the procedure was repeated, with the exception that no liner was provided on the plates and the propellant was bonded directly to the metal surface. The average tensile strength of the three specimens was only 55 pounds per square inch, and in each case the break occurred at the metal-propellant interface.

EXAMPLE II

An uncured fluid mixture was prepared similar to that of Example I with the exceptions that about 1 part of a rubber antioxidizing agent, (symetrical di-betanaphthyl-para-phenylenediamine) was admixed with the homogeneous mixture, and 7.5 parts of zinc chromate were used instead of 5 parts.

Three test sandwiches were prepared as in Example I with the exception that the liner material was applied with a spatula, and the liner was cured for 7 days. The average tensile strength of the three specimens was 99 psi., and break occurred through the propellant in each instance.

EXAMPLE II

An uncured fluid mixture was prepared in a manner similar to Example I, with the exception that 10 parts of zinc chromate instead of 5 parts were employed. The lining composition was applied to the plates with a spatula and was cured at ambient temperature for 13 days.

The lined plates were cemented together with propellant as in Example I and tested in the tensile strength testing device. The average tensile strength for the three specimens was 96 psi. and the break occurred through the propellant in each instance.

EXAMPLE IV

A rubber-base lining composition was prepared as follows:

30 parts of an epoxy resin having a molecular weight of about 375 formed by reacting epichlorohydrin with bisphenol A, were admixed with 15 parts of powdered zinc chromate until substantially homogeneous. To this mixture were added 47.3 parts of a copolymer of butadiene and acrylic acid, and mixing was continued until a substantially homogeneous mass was formed. A curing composition was prepared by admixing 5 parts of p-quinonedioxime, 0.2 parts diphenylquanidine and 2.5 parts magnesium oxide, and the resulting homogeneous curing composition was then admixed with the resin-rubber-base-zinc chromate mixture until substantially homogeneous. All mixing was carried out at room temperature.

The steel plates of Example I were coated by applying the lining material with a spatual and the liners were cured for 17 days. Three "sandwich" specimens were prepared from thermoplastic propellant as in Example I, and after curing, the average tensile strength was 77 psi. The break in the specimens occurred through the propellant in each instance.

EXAMPLE V

A 3 pound test rocket motor vessel having a combustion chamber length of about 3½ inches and an inside diameter of about 5 inches was cleaned by sandblasting and then lined with a ⅛ inch layer of the lining composition of Example I. The propellant of Example I was cast in the liner after curing of the liner and then heated to a temperature of about 60° C. for about 24 hours to effect curing of the propellant. The resulting rocket motor was subjected to cycling tests at −40° C. and 60° C. for 24 hour periods, and after 16 cycles, no deterioration of the liner-propellant bond was found. Several rockets prepared in this manner were successfully fired after 3 to 6 temperature cycles.

EXAMPLE VI

A 70 pound JATO rocket was prepared, employing the liner composition of Example III. No deterioration of the liner-propellant bond was found after 5 cycles between temperatures of −40° C. and 60° C. for 24 hour periods.

EXAMPLE VII

Liners prepared in accordance with the instant invention have relatively uniform elastic properties over a wide range of temperatures. A liner prepared as in Example I was formed into a sheet of ¼ inch thickness and cured. Several "dumbbells" were cut from this sheet, which were about 5 inches long, having a narrow portion in the center about ¼ inch wide, and each end being about 1 inch in width. The dumbbells were placed in a conventional stress testing machine to determine the pressure necessary to break the specimen and the percent of elongation before break. Three specimens were tested at −60° C., three at 25° C., and three at 70° C. The average stress and percent elongation at each temperature, was as follows:

| Temperature | Stress | Elongation |
| --- | --- | --- |
| −60° C. | 396 psi. | 39.6 per cent |
| 25° C. | 173 psi. | 36.1 per cent |
| 70° C. | 126 psi. | 32.0 per cent |

For purposes of comparison, another liner sheet was prepared, in a similar manner with the exception that iron oxide was substituted for the zinc chromate.

This liner was tested in the same manner and the average stress to break and percent elongation at the break were as follows:

| Temperature | Stress | Elongation |
| --- | --- | --- |
| −60° C. | 317 psi. | 43 per cent |
| 25° C. | 157 psi. | 34.75 per cent |
| 70° C. | 113 psi. | 25.5 per cent |

Thus it can be seen that greater pressure was required to break the specimens containing zinc chromate and the elasticity was more uniform over a wide temperature range than a liner that did not contain zinc chromate.

It will be recognized that many modifications and variations, some of which are discussed above, will naturally present themselves to those skilled in the art without departing from the spirit of this invention or the scope of the appended claims.

Having thus described the invention, what is claimed is:

1. In combination with a vessel forming a rocket motor combustion chamber, a rubber-base liner firmly adhering to the interior chamber wall, said rubber-base liner containing between about 2.5 and 30 percent by weight of an inorganic metal salt selected from the group consisting of zinc chromate, barium chromate, zinc phosphate, lead phosphate, potassium phosphate, and mixtures thereof, and a propellant charge substantially filling the lined portion of the chamber, said propellant charge firmly adhering to said liner.

2. The combination of claim 1 wherein said rubber-base liner is the reaction product of an epoxy resin and a copolymer of butadiene and acrylic acid.

3. The composition of claim 1 wherein said inorganic metal salt is zinc chromate.

4. The combination of claim 1 wherein said inorganic metal salt is barium chromate.

5. The combination of claim 1 wherein said inorganic metal salt is zinc phosphate.

6. The combination of claim 1 wherein said inorganic metal salt is lead phosphate.

7. The combination of claim 1 wherein said inorganic metal salt is potassium phosphate.

8. The combination of claim 1 wherein said rubber-base liner is the reaction product of an epoxy resin and a copolymer of butadiene and acrylic acid, and said inorganic metal salt is zinc chromate.

* * * * *